(12) United States Patent
Akers, Jr. et al.

(10) Patent No.: US 7,001,936 B2
(45) Date of Patent: Feb. 21, 2006

(54) PIGMENTED INKJET INK

(75) Inventors: Charles Edward Akers, Jr., Lexington, KY (US); Sandra Helton McCain, Lexington, KY (US); Phillip Wayne Sisk, Lexington, KY (US); Jing X. Sun, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 21 days.

(21) Appl. No.: 10/620,720

(22) Filed: Jul. 16, 2003

(65) Prior Publication Data

US 2005/0014864 A1 Jan. 20, 2005

(51) Int. Cl.
C08F 293/00 (2006.01)
C08G 18/08 (2006.01)
C08J 3/24 (2006.01)
C08K 3/00 (2006.01)
C09D 11/00 (2006.01)

(52) U.S. Cl. ............ 523/161; 524/385; 524/438; 524/714; 524/717; 524/718; 524/720; 524/722; 524/847

(58) Field of Classification Search ........... 523/161; 524/385, 438, 714, 717, 718, 720, 722, 847
See application file for complete search history.

(56) References Cited

U.S. PATENT DOCUMENTS

| 4,264,483 A | 4/1981 | Laufer et al. | |
|---|---|---|---|
| 4,530,961 A | 7/1985 | Nguyen et al. | |
| 4,710,230 A * | 12/1987 | Okoshi et al. | 106/413 |
| 5,067,980 A | 11/1991 | Koike et al. | |
| 5,129,948 A | 7/1992 | Breton et al. | |
| 5,281,262 A | 1/1994 | Saito | |
| 5,302,197 A | 4/1994 | Wickramanayke et al. | |
| 5,316,575 A | 5/1994 | Lent et al. | |
| 5,596,027 A | 1/1997 | Mead et al. | |
| 5,630,868 A | 5/1997 | Belmont et al. | |
| 5,672,198 A | 9/1997 | Belmont | |
| 5,718,746 A | 2/1998 | Nagasawa et al. | |
| 5,719,204 A * | 2/1998 | Beach et al. | 523/161 |
| 5,747,562 A | 5/1998 | Mahmud et al. | |
| 5,749,950 A | 5/1998 | Mahmud et al. | |
| 5,795,970 A | 8/1998 | Ono et al. | |
| 5,877,235 A | 3/1999 | Sakuma et al. | |
| 5,891,934 A | 4/1999 | Moffatt et al. | |
| 5,895,522 A | 4/1999 | Belmont et al. | |
| 5,948,154 A | 9/1999 | Hayashi et al. | |
| 5,952,429 A | 9/1999 | Ikeda et al. | |
| 5,955,515 A | 9/1999 | Kimura et al. | |
| 5,968,243 A | 10/1999 | Belmont et al. | |
| 5,969,005 A | 10/1999 | Yamashita et al. | |
| 5,973,025 A | 10/1999 | Nigam et al. | |
| 5,977,213 A | 11/1999 | Mahmud et al. | |
| 6,017,980 A | 1/2000 | Wang et al. | |
| 6,022,908 A | 2/2000 | Ma et al. | |
| 6,028,137 A | 2/2000 | Mahmud et al. | |
| 6,042,643 A | 3/2000 | Belmont et al. | |
| 6,054,505 A | 4/2000 | Gundlach et al. | |
| 6,057,384 A | 5/2000 | Nguyen et al. | |
| 6,114,411 A | 9/2000 | Nakamura et al. | |
| 6,143,807 A | 11/2000 | Lin et al. | |
| 6,150,433 A | 11/2000 | Tsang et al. | |
| 6,169,129 B1 | 1/2001 | Mahmud et al. | |
| 6,171,382 B1 | 1/2001 | Stubbe et al. | |
| 6,197,274 B1 | 3/2001 | Mahmud et al. | |
| 6,211,265 B1 | 4/2001 | Ohta et al. | |
| 6,228,942 B1 | 5/2001 | Michot et al. | |
| 6,235,829 B1 | 5/2001 | Kwan | |
| 6,245,832 B1 | 6/2001 | Suzuki et al. | |
| 6,247,808 B1 | 6/2001 | Ma et al. | |
| 6,281,267 B1 * | 8/2001 | Parazak | 523/160 |
| 6,402,825 B1 * | 6/2002 | Sun | 106/473 |
| 6,432,194 B1 | 8/2002 | Johnson et al. | |
| 6,440,203 B1 | 8/2002 | Kato | |
| 6,506,517 B1 | 1/2003 | Michot et al. | |
| 6,533,407 B1 | 3/2003 | Mouri et al. | |
| 6,638,350 B1 * | 10/2003 | Butler et al. | 106/31.28 |
| 6,695,898 B1 * | 2/2004 | Momose | 106/31.43 |
| 2001/0009933 A1 | 7/2001 | Miyabayashi | |
| 2001/0023265 A1 | 9/2001 | Hidaka et al. | |
| 2001/0023266 A1 | 9/2001 | Miyabayashi | |
| 2004/0127619 A1 * | 7/2004 | Sun et al. | 524/385 |

FOREIGN PATENT DOCUMENTS

| EP | 0272127 | 12/1997 |
|---|---|---|
| EP | 1035177 | 9/2000 |
| JP | 01079279 | 3/1989 |
| JP | 08337624 | 12/1996 |

OTHER PUBLICATIONS

Tsubokawa, N. et al., "Branched polymer-grafted carbon black with a high percentage of grafting: postgrafting of polyesters from grafted polymer chains on carbon black surface" Journal of Polymer Science and Technology, vol. 50, No. 4, pp. 235-241 (1993), English Abstract.

Yoshikawa, S. et al., "Grafting polymers with controlled molecular weight onto carbon black surface" Polymer Journal, vol. 28, No. 4, pp. 317-322 (1996), Abstract.

* cited by examiner

Primary Examiner—Nathan M. Nutter
(74) Attorney, Agent, or Firm—John A. Brady

(57) ABSTRACT

The present invention provides pigmented inks comprising self-dispersing pigment and an amino-containing compound. The addition of an amino-containing compound to the self-dispersing pigment can improve the reliability and performance of the ink in an inkjet printhead. The present invention also provides methods for making a surface modified pigment comprising associating a self-dispersing pigment with an amino-containing compound having no more than one primary amino group or one secondary amino group.

13 Claims, No Drawings

PIGMENTED INKJET INK

FIELD OF INVENTION

The present invention relates generally to ink. More specifically, it is directed to surface modified pigments and methods for making surface modified pigments for use in ink formulations, particularly inkjet printing.

BACKGROUND

Inkjet printing is accomplished by ejecting ink from a nozzle toward paper or another print medium. The ink is driven from the nozzle toward the medium in a variety of ways. For example, in electrostatic printing, the ink is driven by an electrostatic field. Another inkjet printing procedure, known as squeeze tube, employs a piezoelectric element in the ink nozzle. Electrically-caused distortions of the piezoelectric element pump the ink through the nozzle and toward the print medium. In still another inkjet printing procedure, known as thermal or bubble inkjet printing, the ink is driven from the nozzle toward the print medium by the formation of an expanding vapor phase bubble in the nozzle. These various printing methods are described in "Output Hard Copy Devices," edited by Durbeck and Sherr, Academic Press, 1988 (see particularly chapter 13, entitled "Ink Jet Printing").

The composition of an inkjet ink is traditionally comprised of deionized water, a water-soluble organic solvent, and a colorant. The colorant may be a soluble dye or insoluble pigment. Pigment based inks may have some disadvantages as compared to dye based inks. For example, due to the insolubility of pigments in water, polymeric dispersants and/or surfactants are typically added to improve the dispersibility of the pigment. The addition of a polymeric dispersant can increase the viscosity of an ink, and a viscous ink may be more difficult to jet in a printhead.

To potentially avoid the use of or to reduce the amount of polymeric dispersants used in pigmented ink compositions, pigments can be modified by direct oxidation to generate carboxy groups (COOH) on the surface of the pigment that can make the pigment self-dispersible in aqueous compositions. Such pigments exhibit increased electrostatic stability. However, the electrostatic stability can be sensitive to other characteristics of the ink composition. In particular, electrostatic stability can be very sensitive to the pH and electrolyte concentration. Accordingly, self-dispersing pigments can be prone to coagulation especially within the nozzle of an inkjet print system. Furthermore, such self-dispersing pigments may not be readily soluble with the other components of an ink composition such as humectants and binders.

Thus, the need exists for inks containing self-dispersing pigments with enhanced stability and solubility in the ink composition.

SUMMARY OF THE INVENTION

The present invention relates to an ink comprising a surface modified pigment comprising a self-dispersing pigment and an amino-containing compound with enhanced stability and compatibility in the ink composition. The present invention also relates to a method of producing a surface modified pigment having enhanced stability in an ink composition. According to the invention, a self-dispersing pigment is mixed with an amino-containing organic compound to associate the self-dispersing pigment and the amino-containing compound.

An advantage of the invention is that the surface modified pigment exhibits both electrostatic and steric stability. The electrostatic and steric stability may be maintained within varying pH levels and electrolyte concentrations. Another advantage is that the surface modified pigment resists coagulation as the aqueous components of the ink evaporate during heat application within the inkjet printhead.

Another advantage of the invention is the increase in idle time exhibited by representative ink formulations made with a surface modified pigment. While not wishing to be held to a particular theory, it is believed that the properties of the ink composition in a printhead change as water evaporates from the ink adjacent the nozzles of the printhead. Ink formulations used in inkjet printers are a mixture of water, self-dispersing pigment and organic components such as humectants, binders, penetrants, organic solvent and the like. As water evaporates from the ink, the percentage of organic components in the ink formulation increases so that the ink becomes less hydrophilic. As the ink becomes less hydrophilic, the self-dispersing pigment, which is strongly hydrophilic, is pulled back into the bulk aqueous phase. Idle time is used to measure the short-term reliability of the ink. "Idle time" means the time between nozzle firings just before the printhead produces delayed or misdirected ink droplets. Historically, self-dispersing pigments, such as self-dispersing carbon black, exhibit poor idle times in inkjet printers. The surface modified pigments of the present invention can improve the idle time of an ink formulation because the surface modified pigment remains substantially dispersed in the organic components as well as the aqueous components of the ink formulation.

Similarly, improved ink performance is observed in million fires tests. The million fires test is also used to measure short-term reliability of the ink. "Million Fires" means the number of million fires that alternating nozzles can be jetted repeatedly before the printhead produces delayed or misdirected ink droplets. These delayed or misdirected droplets can be either from the fired nozzles or from nozzles that have been left idle in between the alternating fired nozzles when those nozzles are jetted.

DETAILED DESCRIPTION

Pigmented inks containing self-dispersing pigments can be prone to coagulation resulting in nozzle failure. As a result, one of the problems potentially associated with the use of inks containing self-dispersing pigments is poor maintenance in printing, especially the ink's idling maintenance.

It has been discovered that the addition of amino-containing compounds to inks containing a self-dispersing pigment can improve the reliability and performance of the ink in an inkjet printhead.

In one aspect, the ink composition of the present invention comprises: a self-dispersing pigment, an amino-containing compound comprising no more than one primary amino group or one secondary amino group, and an aqueous vehicle.

In another aspect, the ink composition of the present invention comprises: a self-dispersing pigment associated with an amino-containing compound wherein the amino-containing compound forms a stabilizing layer, and an aqueous vehicle.

In another aspect, the present invention provides a method of preparing a surface modified pigment comprising the steps of: associating a self-dispersing pigment with an amino-containing compound having no more than one primary amino group or one secondary amino group.

As used hereon the term "associated" refers to a non-covalent interaction between the surface functional groups of a self-dispersing pigment and an amino-containing compound. The non-covalent interactions include, but are not limited to, Van der Waals interactions, electrostatic interactions, acid base interactions, ionic bonding, hydrogen bonding, and/or physical absorption.

The amino-containing compound is a non-ionic organic compound comprising at least one amino group. In addition, the amino-containing compound should be soluble in water and/or soluble in water-soluble organic solvents such as, but not limited to, organic solvents that function as a humectant. While not wishing to be held to a particular theory, it is believed that the amino group of the amino-containing compound associates with the surface acid groups of the self-dispersing pigments pigment to provide a pseudosteric layer over a portion of the pigment's surface, thereby providing extra stability to the pigment in addition to the pigment's electrostatic stability. In an embodiment, the association of a self-dispersing pigment with the amino-containing compound forms a surface modified pigment. The additional steric stability of the surface modified pigment relative to the precursor self-dispersing pigment can provide the ink with greatly improved idling maintenance, especially with binder additives. The specific amino-containing compound used may depend upon the type of surface group on the self-dispersing pigment and its acidity. Other factors may also determine which specific amino-containing compound is used.

The amino group of the amino-containing compound may be primary, secondary, or tertiary so long as the amino group is capable of interacting with the surface groups of the self-dispersing pigment. Further, the amino-containing compound comprises no more than one primary amino group or one secondary amino group. In an embodiment, the amino-containing compound comprises one primary amino group and at least one tertiary amino group. In another embodiment, the amino-containing compound comprises a compound having a molecular weight of less than about 600. In another embodiment, the amino-containing compound comprises a compound having a molecular weight of less than about 400. In another embodiment, the amino-containing compound comprises a compound having a molecular weight of less than about 200. In another embodiment, the amino-containing compound further comprises a ring containing 5 to 8 atoms, preferably 5 to 6 atoms. The ring may be saturated, partially saturated, or aromatic. The amino group may or may not be part of the ring containing 5 to 8 atoms. In another embodiment, the amino-containing compound comprises one primary amino group and one tertiary amino group wherein the tertiary amino group is part of a ring containing 5 to 8 atoms. In another embodiment, the amino-containing compound comprises a secondary amino group wherein the secondary amino group is part of a ring containing 5 to 8 atoms.

Examples of amino-containing compounds include, but are not limited to, amino-$C_1$–$C_6$-alkylmorpholines, morpholine, tetrahydrofurfurylamines, amino-$C_1$–$C_6$-alkylpiperidines, and amino-$C_1$–$C_6$-alkylpyrrolidines.

In embodiments where the self-dispersing pigment comprises carboxylate groups, the amount of amino-containing compound is limited by the acid number of the self-dispersing pigment such that a greater amount of amino-containing compound may potentially be added to self-dispersing pigments with higher acid numbers. In an embodiment, the amount of amino-containing compound in the ink composition ranges from about 0.01 to about 10% by weight. In another embodiment, where the acid number of a self-dispersing carbon black pigment ranges from about 0.5 to about 1.5 milliequivalents COOH/gram of carbon black, the amount of amino-containing compound in the ink composition ranges from about 0.05 to about 0.75% by weight.

The self-dispersing pigments used in the ink compositions of the present invention comprise a pigment that has been subjected to surface treatment to bond at least one functional group selected from the group consisting of carbonyl, carboxyl, and hydroxyl groups or a salt thereof onto the surface thereof, permitting the pigment to be dispersed and/or dissolved in water without the aid of any dispersant.

In an embodiment, a self-dispersing pigment comprising a self-dispersing carbon black may be obtained by a wet-oxidation treatment of carbon black using a hypohalous acid and/or salt thereof, according to the methods described in U.S. Pat. Nos. 2,439,442, and 3,347,632. The carbon black which is used as a raw material for the self-dispersing carbon black is generally a carbon powder which is obtained by thermal decomposition or incomplete combustion of a natural gas and liquid hydrocarbon (heavy oil, tar and the like). The kind of carbon black used as a starting material is not particularly limited so long as the carbon black can be used to make a self-dispersing carbon black.

An example of a carbon black that can be used as starting material for preparing a self-dispersing carbon black is Monarch® 880 and the like manufactured by Cabot Corp. of Billerica, Mass.

Such carbon black can be wet-oxidized in water using a hypohalous acid and/or salt thereof to produce a self-dispersing carbon black having carboxylate functional groups on the surface. Specific examples of a hypohalous acid and/or salt thereof include sodium hypochlorite and potassium hypochlorite, and sodium hypochlorite is preferable from the viewpoint of reactivity. In an embodiment, a self-dispersing carbon black in an ink composition of the present invention has an acid number ranging from about 0.5 to about 1.5 milliequivalents COOH/gram of carbon black. Self-dispersing carbon blacks having acid numbers outside this range may also be used.

The ink composition of the present invention may also comprise conventional pigments (i.e. non-self-dispersing pigments). There is essentially no limitation to additional conventional pigments which may be employed in the ink compositions of the present invention. The additional pigments can be black, cyan, magenta, yellow, red, blue, green, brown, and mixtures thereof. Typical examples of additional pigments which may be used in the present invention include dye lakes, azo pigments including condensed azo pigments, and chelate azo pigments; polycyclic pigments, such as phthalocyanine pigments, anthraquinone pigments, quinacridone pigments, dioxazine pigments, thioindigo pigments, isoindolinone pigments, and quinophthalone pigments. Other pigments include nitro pigments, nitroso pigments and daylight fluorescent pigments as well as titanium dioxide, iron oxide, aniline black and carbon black. Preferred pigments for use in the ink compositions are carbon blacks. Examples of suitable carbon black pigments include, but are not limited to, channel black, furnace black, lamp black, and the like. When additional pigments are included in the ink composition, the pigments are optionally dispersed with a dispersant.

A specific example of a carbon black that may be added to the ink composition is Monarch® 880 and the like manufactured by Cabot Corp. of Billerica, Mass.

The ink composition of the present invention may also comprise a dispersant, especially if the ink composition includes a pigment other than a self-dispersing pigment. The dispersants useful in this invention are generally not limited and include any of those capable of dispersing pigments. The dispersants typically comprise hydrophobic and hydrophilic polymeric segments. The hydrophobic segment tends to interact with the pigment particle in the ink compositions and the hydrophilic segment tends to be solvated by the aqueous medium thereby dispersing the pigment.

Illustrative examples of the dispersants which may be employed in the ink compositions of invention include AB, BAB and ABC block copolymers known in the art. Preferred AB and BAB block copolymers include those, for example, which comprise hydrophobic and hydrophilic segments derived from acrylic monomers. Another illustrative example of dispersants includes random polymers.

A preferred class of dispersants which may be employed in the present invention include block and/or graft co- or terpolymers comprising a hydrophilic polymeric segment, and one or two hydrophobic polymeric segment(s) having a hydrolytically stable siloxyl substituent or a hydrophobic amide side chain. A particularly preferred subgroup of these dispersants are graft terpolymers which comprise a hydrophilic polymeric segment (particularly an acrylic or methacrylic acid co- or terpolymer) together with a hydrophobic polymeric segment derived from a polyorganosiloxane as described in U.S. Pat. Nos. 5,719,204 and 5,714,538.

In an embodiment, the polymeric dispersant comprises a hydrophilic polymeric segment and a hydrophobic polymeric segment, having a number average molecular weight of from about 400 to about 8,000, prepared from members selected from the group consisting of reactive surfactant macromers, protective colloid macromers, and non-siloxyl containing hydrophobic monomers. In a preferred embodiment, the hydrophilic polymeric segment of the copolymer comprises an acrylate or methacrylate polymer and the hydrophobic polymeric segment of the copolymer comprises an acryloyl- or methacryloyl-terminated polydialkylsiloxane macromer. In another preferred embodiment, the hydrophobic segment of the copolymer comprises stearyl acrylate, stearyl methacrylate, lauryl acrylate, lauryl methacrylate, nonylphenol acrylate, nonylphenol methacrylate, nonylphenoxy poly(ethyleneoxy)$_n$ methacrylate, wherein n is from about 1 to about 40; nonylphenoxy poly(ethyleneoxy)$_n$ acrylate, wherein n is from about 1 to about 40; methoxypoly(ethyleneoxy)$_n$ methacrylate, wherein n is from about 5 to about 40; methyloxypoly(ethyleneoxy)$_n$acrylate, wherein n is from about 5 to about 40; stearyloxypoly (ethyleneoxy)$_n$methacrylate, wherein n is from about 1 to about 20; stearyloxypoly(ethyleneoxy)$_n$ acrylate, wherein n is from about 1 to about 20; fluorinated $C_1$–$C_{18}$ alkyl methacrylate; fluorinated $C_1$–$C_{18}$ alkyl acrylate; poly(propylene glycol)methyl ether methacrylate; poly(propylene glycol)methyl ether acrylate; poly(propylene glycol) 4-nonylphenol ether methacrylate; poly(propylene glycol) 4-nonylphenol ether acrylate; methacryloxy-trimethylsiloxy-terminated polyethylene oxide; acryloxy-trimethylsiloxy-terminated polyethylene oxide; (polyethylene glycol) 2,4,6-tris-(1-phenylethyl)phenyl ether (SIPOMER/SEM 25™); or mixtures thereof.

The ink composition of the present invention may also comprise a binder. The binder included in the ink compositions of the present invention is generally not limited so long as the binder has an ability to form a film. Typically the binder comprises an emulsion of acrylic resin, methacrylic resin, styrene resin, urethane resin, acrylamide resin, epoxy resin, or a mixture of these resins. The resin is not limited by copolymerization methods and may be, for example, a block copolymer, a random copolymer or the like.

In an embodiment, the binder comprises a latex polymer comprising the monomer units methyl methacrylate, butylacrylate, and methacrylic acid. In another embodiment, the binder comprises a latex polymer comprising the monomer units methyl methacrylate, butylacrylate, 2-hydroxyethyl methacrylate, and methacrylic acid. In another embodiment, the binder comprises a latex polymer comprising the monomer units methyl methacrylate, butyl acrylate, N-hydroxymethyl methacrylamide, and methacrylic acid. In another embodiment, the binder has a molecular weight between 150,000 and 300,000.

The amount of binder used in the inks of the present invention is limited by the binder's compatibility with the other components of the ink composition and its ability to reduce smearing of the ink. In an embodiment, the amount of binder included in the ink composition may range from about 0.1 to about 10% by weight. In another embodiment, the amount of binder in the ink composition ranges from about 1 to about 5% by weight.

The ink composition may further comprise a humectant. Humectants that may be employed in this invention are generally not limited and are known in the art. Illustrative examples include alkylene glycols, polyols, diols, bis-hydroxy terminated thioethers, and lactams. Two or more humectants may be used together in an ink formulation The alkylene glycols useful as humectants generally have a molecular weight of from about 50 to about 4,000. A suitable polyalkylene glycol is polyproylene glycol. Polyols useful as humectants generally contain at least 2 hydroxyl groups or alkyl ether derivatives thereof. As used here, "lactams" is intended to include cyclic amide compounds such as cyclic amides, substituted cyclic amides and cyclic amide derivatives. A suitable lactam is 2-pyrrolidone.

The amount of humectant in the ink composition may range from about 0.1 to about 40% by weight. In an embodiment, the amount of humectant ranges from about 0.5 to about 30% by weight. In another embodiment, the amount of humectant ranges from about 1 to about 20% by weight.

The ink composition may further comprise a penetrant. Penetrants that may be employed in this invention are generally not limited and include hydroxy substituted hydrocarbons like 1,2-alkyl diols such as 1,2-pentanediol, 1,2-hexanediol and mixtures thereof. A more detailed description of such penetrants may be found in U.S. Pat. No. 5,364,461. A suitable penetrant is 1,2-hexanediol.

The amount of penetrant in the ink composition may range from about 0.01 to about 20% by weight. In an embodiment, the amount of penetrant ranges from 0.1 to 10% by weight. In another embodiment, the amount of penetrant ranges from about 0.5 to about 5% by weight.

The aqueous vehicle used in the ink compositions comprises water. The aqueous vehicle may further comprise a second solvent such as an organic solvent which is miscible with water. Selection of a suitable water miscible solvent depends on the requirements of the specific aqueous ink being formulated, such as the desired surface tension and viscosity, the colorant being used, the drying time required for the ink, and the type of paper onto which the ink will be printed. Representative examples of water soluble organic solvents that may be selected include (1) alcohols, such as methyl alcohol, ethyl alcohol, n-propyl alcohol, iso-propyl alcohol, n-butyl alcohol, sec-buty alcohol, t-butyl alcohol, iso-butyl alcohol, furfuryl alcohol, and tetrahydrofurfuryl alcohol; (2) ketones or keto alcohols, such as acetone, methyl ethyl ketone, and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or monoethyl)ether, diethylene glycol monomethyl (or monoethyl)ether, propylene glycol monomethyl (or monoethyl)ether, triethylene glycol monomethyl (or monoethyl) ether and diethylene glycol dimethyl (or diethyl) ether; (7) nitrogen-containing cyclic compounds, such as pyrrolidone, N-methyl-2-pyrrolidone, and 1,3-dimethyl-2-imidazolidinone; and (8) sulfur-containing compounds, such as dimethyl sulfoxide and tetramethylene sulfone. Other useful solvents include lactones and lactams.

When the aqueous vehicle comprises a miscible mixture of water and an organic solvent, the mixtures usually comprise greater than about 25% by weight water to about 99.9% by weight water based on total weight of the mixture. The preferred weight percent of water employed is about 50% to about 99.9% based on total weight of the mixture.

Other additives, such as biocides, viscosity modifiers, anti-kogation agents, anti-curling agents, chelating agents, anti-bleed agents, surfactants, and buffers may be added to the ink composition at their art established levels.

The biocides which may be employed are known and commercially available. They prevent growth of microorganisms in the ink. Examples of biocides that are suitable for use in this invention include those, for instance, which comprise benz-isothiazolin-one, methyl-isothiazolin-one and chloro-methyl-isothiazolin-one. A preferred biocide includes, but is not limited to, Proxel® GXL (available from Avecia).

The pH of the ink compositions of the present invention is typically between 5 and 9. The appropriate pH for the ink composition can be obtained by adding either a base or an acid as necessary. Appropriate acids and bases are well known in the art.

The ink composition of the present invention may be prepared by any method known in the art for making such compositions. When used in various inkjet printheads, the ink composition generally have a viscosity of less than 10 cps, preferably less than 5 cps, at 25° C.

Application of the inkjet inks of this invention onto a print substrate can be made by any suitable printing process compatible with the aqueous-based inks, such as flexographic printing, pen plotters, continuous stream inkjet printing, drop-on-demand inkjet printing (including piezoelectric, acoustic, and thermal inkjet processes), or the like. The inkjet ink compositions of this invention are extremely useful in the thermal inkjet printing process. The print substrate employed may be any print substrate compatible with aqueous-based inks, including plain papers, such as commercial bond papers; coated papers (or special inkjet papers), such as those available from Hewlett Packard, Kodak, Ilford, Canon, and Xerox Corporation; textiles; special inkjet papers, including silica coated papers and photorealistic inkjet papers; photographic papers; and inkjet transparency materials suitable for aqueous inks or inkjet printing processes.

The following examples are detailed descriptions of methods of preparation and use of the inks and the ink system of the present invention. The detailed descriptions fall within the scope of, and serve to exemplify, the more general description set forth above. These examples are presented for illustrative purposes only, and not intended as a restriction on the scope of the invention.

EXAMPLES

The ink formulations of the present invention in Examples 1–6 and Control Example A were prepared according to the following Procedure A with the ingredients listed in Table 1.

TABLE 1

Ingredients of Ink Formulation

| Ingredient | % w/w |
|---|---|
| Monarch ® 880 Pigment dispersed in a siloxy polymeric dispersant in a 5:1 pigment to dispersant ratio | 2.0 |
| Self-dispersing carbon black pigment | 2.0 |
| Polyethylene glycol (MW 400) | 7.5 |
| 2-Pyrrolidone | 7.5 |
| 1,2-Hexanediol | 1.2 |
| Hexylcarbitol | 0.4 |
| Binder (butyl acrylate/methyl methacrylate/acrylic acid) | 2.0 |
| Amino-containing compound | 0.25–0.50 |
| Water | balance |

Procedure A

The ink formulation was prepared by initially mixing deionized water, polyethylene glycol (MW 400), 2-pyrrolidone, 1,2-hexanediol, hexylcarbitol, and Acryjet® 3666 (Butyl acrylate/methyl methacrylate/1.3% acrylic acid binder) and stirring the mixture for approximately 10 minutes.

A concentrate containing deionized water, carbon black pigment, and an acrylic terpolymer dispersant was prepared and added to the first mixture while stirring. The carbon black pigment was Monarch® M880 available from Cabot Corp. The acrylic terpolymer was made by polymerizing methacrylic acid, stearyl methacrylate and dimethyl siloxane according to U.S. Pat. No. 5,714,538.

The final ink component was a self-dispersing carbon black mixed with an amino-containing compound. The self-dispersing carbon black was an oxidized carbon black made by reacting the carbon black with sodium hypochlorite (0.4 to 5.25 parts hypochlorite per part carbon black by weight) in an aqueous medium as described in U.S. Pat. No. 3,347,632. The raw material for making the self-dispersing carbon black was Monarch® 880 from Cabot Corp. The mixture of the self-dispersing carbon black and the amino-containing compound was added to the ink formulation and mixed for 20 minutes. The ink was filtered through a series of filters with the final filter being 1.2 microns.

Example 1

An ink composition was prepared according to Procedure A with 0.50% of an amino-containing compound comprising 4-(2-aminoethyl)morpholine.

Example 2

An ink composition was prepared according to Procedure A with 0.50% of an amino-containing compound comprising tetrahydrofurfuryl amine.

Example 3

An ink composition was prepared according to Procedure A with 0.50% of an amino-containing compound comprising morpholine.

Example 4

An ink composition was prepared according to Procedure A with 0.25% of an amino-containing compound comprising 4-(2-aminoethyl)morpholine.

Example 5

An ink composition was prepared according to Procedure A with 0.25% of an amino-containing compound comprising tetrahydrofurfuryl amine.

Example 6

An ink composition was prepared according to Procedure A with 0.25% of an amino-containing compound comprising morpholine.

Control Example A

An ink composition was prepared according to Procedure A with the exception that no amino-containing compound was added.

The inks of Examples 1–6 and Control Example A were tested for their idle time performance with a printhead having 208 nozzles and a drop mass of 30 ng. A summary of the data collected is presented in Table 2.

TABLE 2

Maintenance Data

| Ink | Idle Time (sec) |
| --- | --- |
| Control Example A | 10 |
| Example 1<br>0.50% 4-(2-Aminoethyl)morpholine | 19–20 |
| Example 2<br>0.50% Tetrahydrofurfuryl amine | 15 |
| Example 3<br>0.50% Morpholine | 15 |
| Example 4<br>0.25% 4-(2-Aminoethyl)morpholine | 18–19 |
| Example 5<br>0.25% Tetrahydrofurfuryl amine | 13 |
| Example 6<br>0.25% Morpholine | 13 |

The data presented in Table 2 demonstrates that the addition of an amino-containing compound to a self-dispersing pigment, such as self-dispersing carbon black, can improve the idling maintenance of the ink relative to Control Example A. For example, the idle time for the ink formulations in Examples 1 and 4 is almost doubled relative to Control Example A.

The ink formulations of Examples 7–8 were prepared according to Procedure B with the ingredients listed in Table 3.

TABLE 3

Ingredients of Ink Formulation

| Ingredient | % w/w |
| --- | --- |
| Monarch ® 880 Pigment dispersed in a siloxy polymeric dispersant in a 5:1 pigment to dispersant ratio | 2.0 |
| Self-dispersing carbon black pigment | 2.0 |
| Polyethylene glycol (MW 400) | 7.5 |
| 2-Pyrrolidone | 7.5 |
| 1,2-Hexanediol | 1.2 |
| Hexylcarbitol | 0.4 |
| Binder (butyl acrylate/methyl methacrylate/acrylic acid) | 0.5 |
| Amino-containing compound | 0.25–0.50 |
| Water | balance |

Procedure B

The ink formulation was prepared by initially mixing deionized water, polyethylene glycol (MW 400), 2-pyrrolidone, 1,2-hexanediol, hexylcarbitol, an amino-containing compound, and Acryjet® 3666 (Butyl acrylate/methyl methacrylate/1.3% acrylic acid binder) and stirring for approximately 10 minutes.

A concentrate containing deionized water, carbon black pigment and an acrylic terpolymer dispersant was prepared and added to the first mixture while stirring. The carbon black pigment was Monarch® M880 available from Cabot Corp. The acrylic terpolymer was made by polymerizing methacrylic acid, stearyl methacrylate and dimethyl siloxane according to U.S. Pat. No. 5,714,538.

The final ink component was a self-dispersing carbon black. The self-dispersing carbon black was an oxidized carbon black made by reacting the carbon black with sodium hypochlorite (0.4 to 5.25 parts hypochlorite per part carbon black by weight) in an aqueous medium as described in U.S. Pat. No. 3,347,632. The raw material for making the self-dispersing carbon black was Monarch® 880 from Cabot Corp. The self-dispersing carbon black was added to the ink formulation and mixed for 20 minutes. The ink was filtered through a series of filters with the final filter being 1.2 microns.

Example 7

An ink composition was prepared according to Procedure B with 0.25% of an amino-containing compound comprising 4-(2-aminoethyl)morpholine (AEM).

Example 8

An ink composition was prepared according to Procedure B with 0.50% of an amino-containing compound comprising 4-(3-aminopropyl)morpholine (APM).

Control Example B

An ink composition was prepared according to Procedure B with the exception that no amino-containing compound was added.

The ink formulations of Examples 9–11 were prepared according to Procedure B with the ingredients listed in Table 4.

TABLE 4

Ingredients of Ink Formulation

| Ingredient | % w/w |
| --- | --- |
| Monarch ® 880 Pigment dispersed in a siloxy polymeric dispersant in a 5:1 pigment to dispersant ratio | 1.9 |

TABLE 4-continued

Ingredients of Ink Formulation

| Ingredient | % w/w |
|---|---|
| Self-dispersing carbon black pigment | 1.9 |
| Polyethylene glycol (MW 400) | 7.5 |
| 2-Pyrrolidone | 7.5 |
| 1,2-Hexanediol | 1.2 |
| Hexylcarbitol | 0.4 |
| Binder (butyl acrylate/methyl methacrylate/acrylic acid) | 1.75 |
| Amino-containing compound | 0.10–0.50 |
| Water | balance |

Example 9

An ink composition was prepared according to Procedure B with 0.25% of an amino-containing compound comprising 4-(2-aminoethyl)morpholine (AEM).

Example 10

An ink composition was prepared according to Procedure B with 0.50% of an amino-containing compound comprising 4-(3-aminopropyl)morpholine (APM).

Example 11

An ink composition was prepared according to Procedure B with 0.10% of an amino-containing compound comprising 4-(2-aminoethyl)morpholine (AEM).

Control Example C

An ink composition was prepared according to Procedure B with the exception that no amino-containing compound was added.

The inks of Examples 7–11 and Control Examples B and C were tested for their idle time performance with a printhead having 640 nozzles and a drop mass of 24 ng. A summary of the data collected is presented in Table 5.

TABLE 5

Maintenance Data

| Ink | Dry time (sec) | Idle Time (sec) | Million Fires |
|---|---|---|---|
| Control B | 14.7 | 4 | 8.5 |
| Example 7 with 0.25% AEM | 13.3 | 5.5 | — |
| Example 8 with 0.50% APM | 11.3 | 4 | — |
| Control C | 13 | 0–2 | 3.2 |
| Example 9 with 0.25% AEM | 11.8 | 6 | — |
| Example 10 with 0.50% APM | 13.5 | 4.5 | — |
| Example 11 with 0.10% AEM | — | 4–5 | 11.8 |

The data presented in Table 5 demonstrates that the addition of an amino-containing compound to a self-dispersing pigment, such as self-dispersing carbon black, can improve the idling maintenance of the ink relative to Control Examples B and C. For example, a loss in idle time associated with an increase in binder content (compare idle time and binder content of Control B and Control C) can be recovered by the addition of an amino-containing compound to a self-dispersing pigment, such as self-dispersing carbon black (compare idle time and binder content of Control C and Examples 9 and 10). In addition, a loss in million fires associated with an increase in binder content (compare million fires and binder content of Control B and Control C) can be recovered by the addition of an amino-containing compound to a self-dispersing pigment, such as self-dispersing carbon black (compare million fires and binder content of Control C and Example 11).

In summary, numerous benefits have been described which result from employing the concepts of the invention. The foregoing description of an embodiment of the invention has been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. An inkjet ink comprising:
   a self-dispersing pigment;
   a basic, amine-functional-group-containing compound selected from the group consisting of cyclic compounds comprising only one secondary amine functional group in the cyclic ring structure of said compounds and having no primary amine functional group, compounds comprising only one primary amine functional group and at least one tertiary amine functional group and having no secondary amine functional group, and tetrahydrofurfuryl amine; and
   an aqueous vehicle.

2. The inkjet ink of claim 1, wherein the self-dispersing pigment is a surface oxidized carbon black.

3. The inkjet ink of claim 2, wherein the self-dispersing carbon black has been oxidized to form carboxylate functional groups on the surface of the carbon black.

4. The inkjet ink of claim 3, wherein the self-dispersing carbon black has an acid number of about 0.5 to about 1.5 milliequivalents of COOH/gram of carbon black.

5. The inkjet ink of claim 1, wherein the amine-functional-group-containing compound comprises one primary amine functional group and at least one tertiary amine functional group.

6. The inkjet ink of claim 1, wherein the amine-functional-group-containing compound has a molecular weight of less than about 600.

7. The inkjet ink of claim 1, wherein the amine-functional-group-containing compound comprises said ring containing 5 to 8 atoms.

8. The inkjet ink of claim 1, wherein the amine-functional-group-containing compound comprises one primary amine functional group and one tertiary amine functional group wherein the tertiary amine functional group is part of a ring containing 5 to 8 atoms.

9. The inkjet ink of claim 1, further comprising a binder.

10. The inkjet ink of claim 1, further comprising a pigmented dispersion comprising a pigment and a polymeric dispersant.

11. The inkjet ink of claim 10, wherein the pigmented dispersion comprises carbon black pigment.

12. The inkjet ink of claim 1, further comprising
    a pigmented dispersion comprising a pigment and a polymeric dispersant; and
    a binder.

13. The inkjet ink of claim 12, wherein the pigmented dispersion comprises carbon black pigment.

* * * * *